(12) United States Patent
Jalaldeen et al.

(10) Patent No.: US 8,543,971 B2
(45) Date of Patent: Sep. 24, 2013

(54) SPECIFYING ON THE FLY SEQUENTIAL ASSEMBLY IN SOA ENVIRONMENTS

(75) Inventors: Ahamed Jalaldeen, Karnataka (IN); Siddharth N. Purohit, Allen, TX (US); Manisha Sharma, New Delhi (IN); Gandhi Sivakumar, Victoria (AU); Ram Viswanathan, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 13/181,680

(22) Filed: Jul. 13, 2011

(65) Prior Publication Data

US 2013/0019245 A1 Jan. 17, 2013

(51) Int. Cl.
*G06F 9/44* (2006.01)

(52) U.S. Cl.
USPC .......................................... 717/105; 717/104

(58) Field of Classification Search
USPC .................................................. 717/105, 113
See application file for complete search history.

(56) References Cited

U.S. PATENT DOCUMENTS

| | | | | |
|---|---|---|---|---|
| 6,895,573 B2 * | 5/2005 | Nørgaard et al. | | 717/100 |
| 7,149,747 B1 * | 12/2006 | Cheng et al. | | 1/1 |
| 7,653,008 B2 | 1/2010 | Patrick et al. | | |
| 7,996,850 B2 * | 8/2011 | Massmann et al. | | 719/320 |
| 8,140,590 B2 * | 3/2012 | Genovese et al. | | 707/804 |
| 8,176,092 B2 * | 5/2012 | Kriegesmann | | 707/802 |
| 8,271,998 B2 * | 9/2012 | Dettori et al. | | 719/320 |
| 2003/0004746 A1 | 1/2003 | Kheirolomoom et al. | | |
| 2003/0126584 A1 | 7/2003 | Creamer et al. | | |
| 2006/0236306 A1 * | 10/2006 | DeBruin et al. | | 717/113 |
| 2007/0226222 A1 * | 9/2007 | Yamamoto et al. | | 707/9 |
| 2008/0028329 A1 * | 1/2008 | Erl | | 715/764 |
| 2008/0140759 A1 * | 6/2008 | Conner et al. | | 709/201 |
| 2008/0140760 A1 * | 6/2008 | Conner et al. | | 709/201 |
| 2010/0017783 A1 * | 1/2010 | Brininstool et al. | | 717/101 |
| 2010/0031232 A1 | 2/2010 | Glazier et al. | | |
| 2010/0088701 A1 | 4/2010 | Greiner et al. | | |
| 2010/0199260 A1 * | 8/2010 | Duggal et al. | | 717/106 |
| 2011/0088036 A1 * | 4/2011 | Patanella | | 718/102 |
| 2011/0252037 A1 * | 10/2011 | Abrahams et al. | | 707/741 |

OTHER PUBLICATIONS

Balani et al., Getting Started with IBM WebSphere Business Services Fabric V6.1, International Business Machines Corporation, 2008; 540 pages; chapters 3 and 4, pp. 15-82.

(Continued)

*Primary Examiner* — Chat Do
*Assistant Examiner* — Chau Nguyen
(74) *Attorney, Agent, or Firm* — Schmeiser, Olsen & Watts; John Pivnichny

(57) ABSTRACT

A method and system for defining an interface of a service in a service-oriented architecture environment. Definitions of atomic tasks of a request or response operation included in a service are received. Unique identifiers corresponding to the atomic tasks are assigned. A sequence map required to implement the service is received. The sequence map is populated with a sequence of the assigned unique identifiers corresponding to a sequence of the atomic tasks of the operation. At runtime, an interface of the service is automatically and dynamically generated to define the service by reading the sequence of unique identifiers in the populated sequence map and assembling the sequence of the atomic tasks based on the read sequence of unique identifiers.

12 Claims, 5 Drawing Sheets

(56) References Cited

OTHER PUBLICATIONS

Jovanovic et al., Dynamic Assembly of Personalized Learning Content on the Semantic Web, Source: The Semantic Web: Research and Applications, Lecture Notes in Computer Science, 2006, vol. 4011/2006, pp. 545-559.

Berbner et al., An approach for the Management of Service-oriented Architecture (SoA) based Application Systems, EMISA 2005, pp. 208-221.

Timm et al., Towards Reliable SOA—An Architecture for Quality Management of Web Services, Source: On the Move to Meaningful Internet Systems: OTM 2008 Workshops Lecture Notes in Computer Science, 2008, vol. 5333, pp. 170-179.

Configuring High Availability for Oracle Fusion Middleware SOA Suite, Oracle® Fusion Middleware High Availability Guide 11g Release 1 (11.1.1), [online]; [Retrieved Oct. 1, 2010], 123 pages, Retrieved from the Internet: <URL: http://sqltech.cl/doc/oas/11gR1/core.1111/e10106/ha_soa.htm>.

Ritchie et al., Patterns: Integrating WebSphere ILOG JRules with IBM Software, International Business Machines Corporation, 2010; 368 pages.

Introduction to IBM WebSphere Business Services Fabric [online]; [Retrieved Jun. 27, 2011]; Retrieved from the Internet: <URL: http://publib.boulder.ibm.com/infocenter/dmndhelp/v6r1mx/topic/com.ibm.ws.fabric.install.doc/fpi/concept/c_introdn_wbsf.html?resultof=%22%66%61%62%72%69%63%22%20%22%22%69%6e-%74%72%6f%64%75%63%74%69%6f%6e%22%20%22%69%-6e%74%72%6f%64%75%63%74%22%20 >; 1 page.

\* cited by examiner

SPECIFYING ON THE FLY SEQUENTIAL ASSEMBLY IN SOA ENVIRONMENTS

TECHNICAL FIELD

The present invention relates to a data processing method and system for defining services in a service-oriented architecture, and more particularly to a technique for dynamically assembling tasks to generate a service definition in a service-oriented architecture environment.

BACKGROUND

Known methods for creating service components that perform rules-based functionality require a specification of a sequence of carrying out rules and atomic tasks. Rules-based functionality is extremely complex and is sequence sensitive, thereby imposing rigidity in re-use scenarios, where a user is required to create different static models for different operations (e.g., create a corresponding static model for each combination of the service interaction pattern). For example, if a user needs Operation 1 to use four decision points, each containing a set of rule nodes and three tasks in a certain sequence, and also needs an Operation 2 that uses most of the same decision points and tasks that Operation 1 uses, then the user is forced to create different static models for Operations 1 and 2, despite the decision points and tasks that Operations 1 and 2 have in common. Because of the required proliferation of more and more static models, reusability is ineffective, process implementations are inflexible, and resource consumption is increased and inefficient. Furthermore, known business rules management tools may utilize dynamic assembly, where each process can be coupled to another process dynamically by creating dynamic decision points which are configured using metadata of the called services (i.e., processes). At runtime, the appropriate service is invoked, depending upon the criteria set in the dynamic decision points. Invoking the appropriate service by carrying out rules in metadata requires the user to define and maintain metadata for every service and read the metadata in each dynamic decision point, which is unsuitable for a decision or rules based environment where there is a significant number of decision points and the granularity is atomic (e.g., a granularity that characterizes a check such as "if Payment>500 USD"). Defining and maintaining metadata for each of such services and defining the decision points not only proliferates the elements of the decision points, but also is time consuming and leads to increased maintenance costs. Thus, there exists a need to overcome at least one of the preceding deficiencies and limitations of the related art.

BRIEF SUMMARY

Embodiments of the present invention provide a method of defining an interface of a service in a service-oriented architecture environment. The method comprises:

a computer receiving definitions of atomic tasks of a first operation included in a first service, the first operation being a request or a response;

the computer assigning unique identifiers corresponding to the atomic tasks;

the computer receiving a sequence map required to implement the first service, wherein the received sequence map includes a sequence of the unique identifiers corresponding to a sequence of the atomic tasks of the first operation; and the computer at runtime dynamically and automatically generating a first interface of the first service to define the first service by reading the sequence of the unique identifiers in the received sequence map and chaining the sequence of the atomic tasks based on the read sequence of the unique identifiers.

A system, program product and a process for supporting computing infrastructure where the process provides at least one support service are also described and claimed herein, where the system, program product and process for supporting computing infrastructure correspond to the aforementioned method.

Embodiments of the present invention provide a technique for defining a service interface that promotes reusability of components while decreasing static memory consumption and avoiding time-consuming efforts involved in creating a corresponding static model for each operation and in creating and maintaining metadata for each service.

DETAILED DESCRIPTION

Overview

Embodiments of the present invention may provide a method and system in a service-oriented architecture (SOA) environment for using a graphical user interface (GUI) to create a service container to store all services and decision points, along with unique identifiers for each atomic task and/or rule node of the services. A palette may be provided by which a user specifies a sequence map of atomic tasks and/or rule nodes by using the unique identifiers and the user associates the sequence map with an operation included in a service. By reading the sequence map and by chaining the atomic tasks and/or rule nodes from the service container that are indicated by the sequence map, embodiments of the present invention create an instance of the sequence of atomic tasks and/or rule nodes, thereby completing an on-the-fly sequential assembly of the atomic tasks and/or rule nodes of the service from a sequence map.

As used herein, an atomic task is defined as a task or process that cannot be decomposed further.

System for On-The-Fly Sequential Assembly

Figure 1:
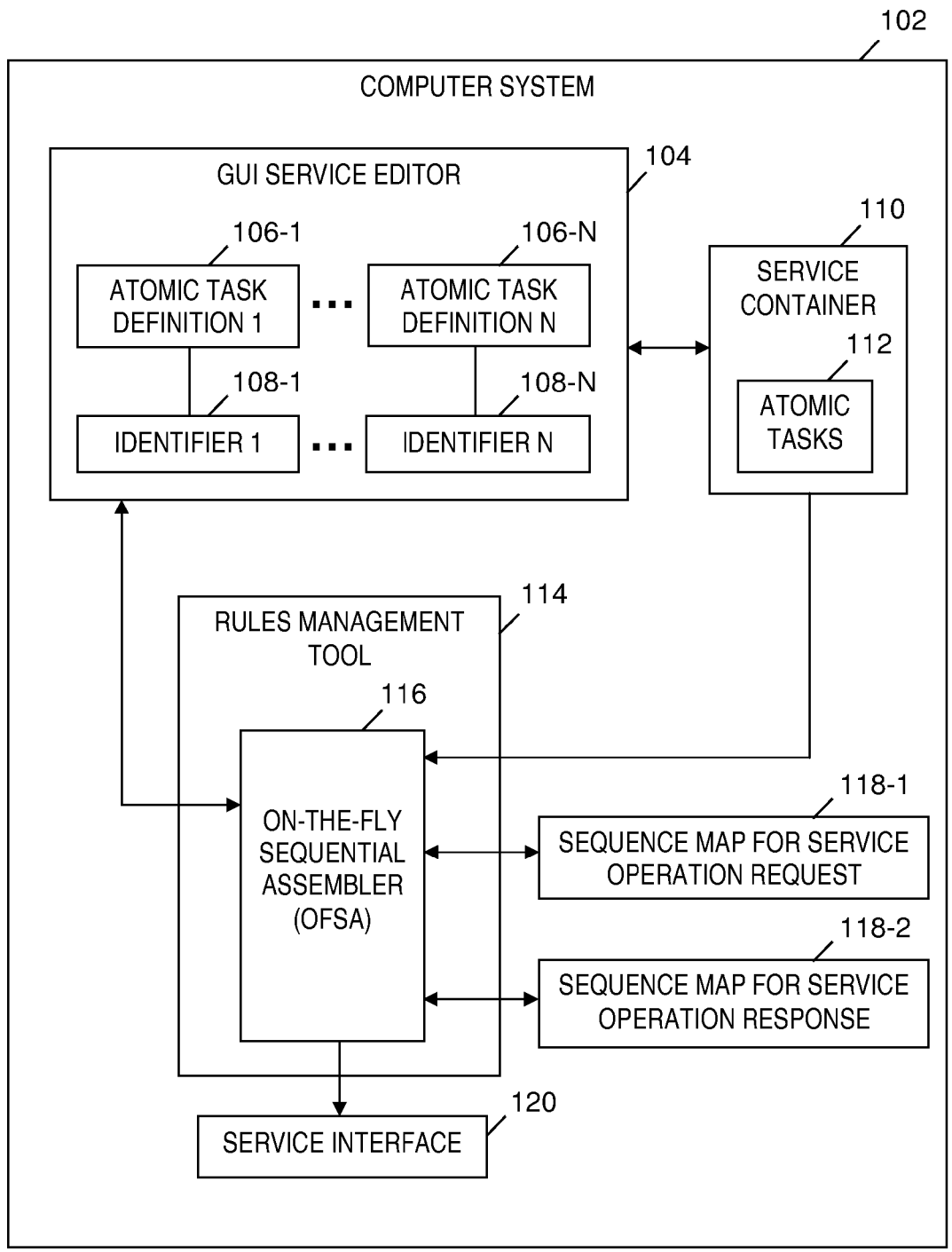
FIG. 1 is a block diagram of a system for dynamically assembling atomic tasks from a sequence map to generate a service interface, in accordance with embodiments of the present invention.

FIG. 1 is a block diagram of a system for dynamically assembling atomic tasks from a sequence map to generate a service interface, in accordance with embodiments of the present invention. A computer system 102 includes a software-based GUI service editor 104. GUI service editor 104 provides an interface by which a user specifies one or more definitions of atomic tasks, such as atomic task definition 106-1 ... atomic task definition 106-N, where N is a positive integer. Computer system 102 assigns a corresponding unique identifier 108-1 ... 108-N to each atomic task definition 106-1 ... 106-N. A service container 110 (a.k.a. service chamber) generated via the GUI service editor 104 stores atomic tasks 112 whose definitions are specified via the GUI service editor. Although not shown in FIG. 1, the interface provided by GUI service editor 104 may also allow the user to specify one or more rule nodes, where each rule node is assigned its own unique identifier. The defined rule nodes are stored in service container 110.

Computer system 102 also includes a software-based rules management tool 114, which includes a software-based on-the-fly sequential assembler (OFSA) 116. Rules management tool 114 may be any tool capable of managing business rules and SOA; for example, Rational® Software Architect (RSA), WebSphere® Integration Developer (WID), or ILOG BRMS (Business Rules Management System). RSA and WID are SOA modeling tools and ILOG BRMS is a rules management tool offered by International Business Machines Corporation located in Armonk, N.Y. OFSA 116 may reside as a plug-in in SOA based rules management tool 114 and may provide the GUI of service editor 104. OFSA 116 may host reusable decision points that function as services with atomic granularity, where the decision points are assembled during runtime at a single stretch and run in a server such as a WebSphere® Process Server (WPS), thereby reducing the consumed computer resources by increasing reusability.

OFSA 116 may provide a palette (a.k.a. template) by which a user may specify sequence maps including sequence maps 118-1 and 118-2, each of which specifies a sequence of atomic tasks 112 and/or rule nodes by using a sequence of identifiers of the atomic tasks 112 and/or rule nodes (e.g., a sequence of identifiers 108-1 ... 108-N). In response to computer system 102 invoking an operation of a service, OFSA 116 generates a service interface 120, which may include an instantiation of a sequence of atomic tasks 112 and/or rule nodes, by dynamically assembling the sequence of atomic tasks and/or rule nodes from service container 110.

The functionality of the components of computer system 102 is further described below relative to FIG. 2, FIG. 3A and FIG. 3B.

Process for On-The-Fly Sequential Assembly

Figure 2:
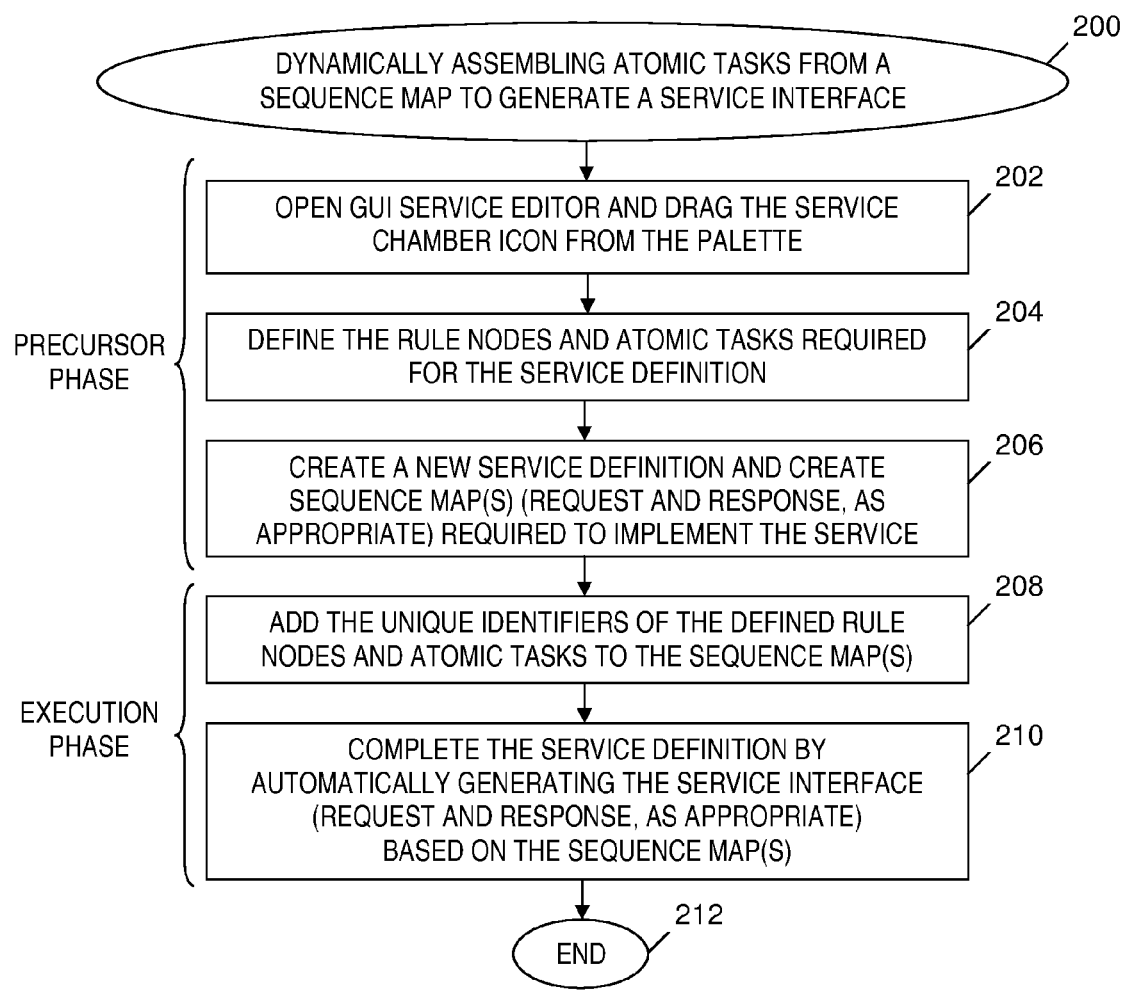
FIG. 2 is a flowchart of a process of dynamically assembling atomic tasks from a sequence map to generate a service interface, where the process is implemented in the system of FIG. 1, in accordance with embodiments of the present invention.

FIG. 2 is a flowchart of a process of dynamically assembling atomic tasks from a sequence map to generate a service interface, where the process is implemented in the system of FIG. 1, in accordance with embodiments of the present invention. The process of dynamically assembling atomic tasks from a sequence map to generate a service interface begins at step 200. Steps 202, 204 and 206 are in a precursor phase that is prior to a runtime phase, which includes steps 208 and 210.

In step 202, computer system 102 (see FIG. 1) opens GUI service editor 104 (see FIG. 1). A user utilizing the GUI service editor makes a selection of service container 110 (see FIG. 1) to store atomic tasks and/or rule nodes of operation(s) of any service. For example a user utilizing computer system 102 (see FIG. 1) drags a service chamber icon from a palette to make the selection of service container 110 (see FIG. 1).

In step 204, computer system 102 (see FIG. 1) receives definitions of atomic tasks and/or rule nodes, such as atomic task definitions 106-1 ... 106-N in FIG. 1. The definitions of atomic tasks and/or rule nodes may be specified in service container 110 (see FIG. 1). The atomic tasks and/or rule nodes whose definitions are received in step 204 are elements of an operation included in a service and are required for a definition of the service (i.e., a service definition that includes a definition of the service interface 120 in FIG. 1). The atomic tasks, rule nodes and service container definitions are independent entities that are editable via GUI service editor 104 (see FIG. 1).

After receiving the definitions in step 204, OFSA 116 (see FIG. 1) assigns unique identifiers to corresponding atomic tasks and/or rule nodes whose definitions are received in step 204. For example, OFSA 116 (see FIG. 1) assigns identifier 108-1 ... 108-N (see FIG. 1) respectively to the atomic tasks defined by atomic task definitions 106-1 ... 106-N (see FIG. 1).

In step 206, the user (e.g., designer) creates a new service definition and creates sequence map(s) (e.g., sequence maps 118-1 and 118-2 in FIG. 1) for a request and response of an operation of the aforementioned service, as appropriate. Each sequence map is associated with a service and specifies a chain of atomic tasks and/or rules that are required to implement the associated service. The user creates sequence maps for every service operation request and response that is to be picked by OFSA 116 (see FIG. 1) at runtime to generate corresponding chains of atomic tasks and/or rules. The computer system 102 (see FIG. 1) receives the user-created sequence maps.

In step 208, computer system 102 (see FIG. 1) populates each of the sequence map(s) created in step 206 with a sequence of the unique identifiers corresponding to a sequence of the atomic tasks and/or rule nodes whose definitions are received in step 204. In one embodiment, OFSA 116 (see FIG. 1) provides a palette by which a user specifies a sequence of unique identifiers to be included in the sequence map 118-1 (see FIG. 1) and by which the user associates the sequence map 118-1 (see FIG. 1) with a request of a corresponding operation included in the service. The user further uses the provided palette to specify another sequence of unique identifiers to be included in the sequence map 118-2 (see FIG. 1) and to associate the sequence map 118-2 (see FIG. 1) with a response of the corresponding operation included in the service.

In step 210, which is at runtime of computer system 102 (see FIG. 1) and in response to the computer system invoking an operation included in the service, the computer system 102 (see FIG. 1) completes the service definition by automatically and dynamically generating the service interface (i.e., for the operation's request and response, as appropriate) based on the sequence map(s) created in step 206 and populated in step 208. The generation of the service interface includes OFSA 116 (see FIG. 1) selecting sequence map 118-1 (see FIG. 1) based on the aforementioned association between the sequence map and the operation request, reading the sequence of unique identifiers included in sequence map 118-1 (see FIG. 1), retrieving from service container 110 (see FIG. 1) the atomic tasks 112 (see FIG. 1) and/or rule nodes corresponding to the read sequence of unique identifiers included in the sequence map 118-1 (see FIG. 1), assembling (i.e., chaining) the retrieved atomic tasks 112 (see FIG. 1) and/or rule nodes in the sequence specified by sequence of unique identifiers included in the sequence map 118-1 (see FIG. 1), and creating an instance of the atomic tasks 112 (see FIG. 1) and/or rule nodes. The generation of the service interface further includes OFSA 116 (see FIG. 1) selecting sequence map 118-2 (see FIG. 1) based on the aforementioned association between the sequence map and the operation response, reading the sequence of unique identifiers included in sequence map 118-2 (see FIG. 1), retrieving from service container 110 (see FIG. 1) the atomic tasks 112 (see FIG. 1) and/or rule nodes corresponding to the read sequence of unique identifiers included in the sequence map 118-2 (see FIG. 1), assembling the retrieved atomic tasks 112 (see FIG. 1) and/or rule nodes in the sequence specified by sequence of unique identifiers included in the sequence map 118-2 (see FIG. 1), and creating an instance of the atomic tasks 112 (see FIG. 1) and/or rule nodes. The generation of the service interface in step 210 by dynamically assembling the atomic tasks and/or rule nodes eliminates the need for creating different static models corresponding to each operation included in a service, and eliminating the need for reading metadata, performing a match, and, in response, invoking an appropriate service, which advantageously reduces efforts and time associated with the generation of a service definition.

The process of FIG. 2 ends at step 212.

In one embodiment, the first iteration of the process of FIG. 2 is followed by a second iteration of the process of FIG. 2 for the generation of a second interface of a second service. The repeating of the process of FIG. 2 includes computer system 102 (see FIG. 1) receiving second definitions of a second set of atomic tasks and/or rule nodes of a second operation included in the second service. For simplicity, the second set of atomic tasks and/or rule nodes are hereinafter referred to as the second atomic tasks. After receiving the second definitions, OFSA 116 (see FIG. 1) assigns second unique identifiers corresponding to the second set of atomic tasks and/or rule nodes. The computer system 102 (see FIG. 1) receives a second user-created and user-populated sequence map that specifies the atomic tasks and/or rule nodes in the second set. The received second sequence map includes a second sequence of the second unique identifiers corresponding to a second sequence of the atomic tasks and/or rule nodes in the second set.

Following the populating of the second sequence map, OFSA 116 (see FIG. 1) dynamically and automatically generates the second interface of the second service to define the second service by reading the second sequence of the second unique identifiers in the populated second sequence map and subsequently assembling (i.e., chaining) the second sequence of the second atomic tasks based on the read second sequence of the second unique identifiers.

The reading of the second sequence of second unique identifiers and the chaining of the second sequence may include re-using at least one unique identifier of the unique identifiers that had been used in the first iteration of the process of FIG. 2.

Furthermore, the dynamically and automatic generation of the first interface and the second interface does not require different static models corresponding to the different operations in the first and second iterations of the process of FIG. 2, and does not require creating metadata corresponding to the services in the first and second iterations of the process of FIG. 2.

EXAMPLES

Figure 3A:
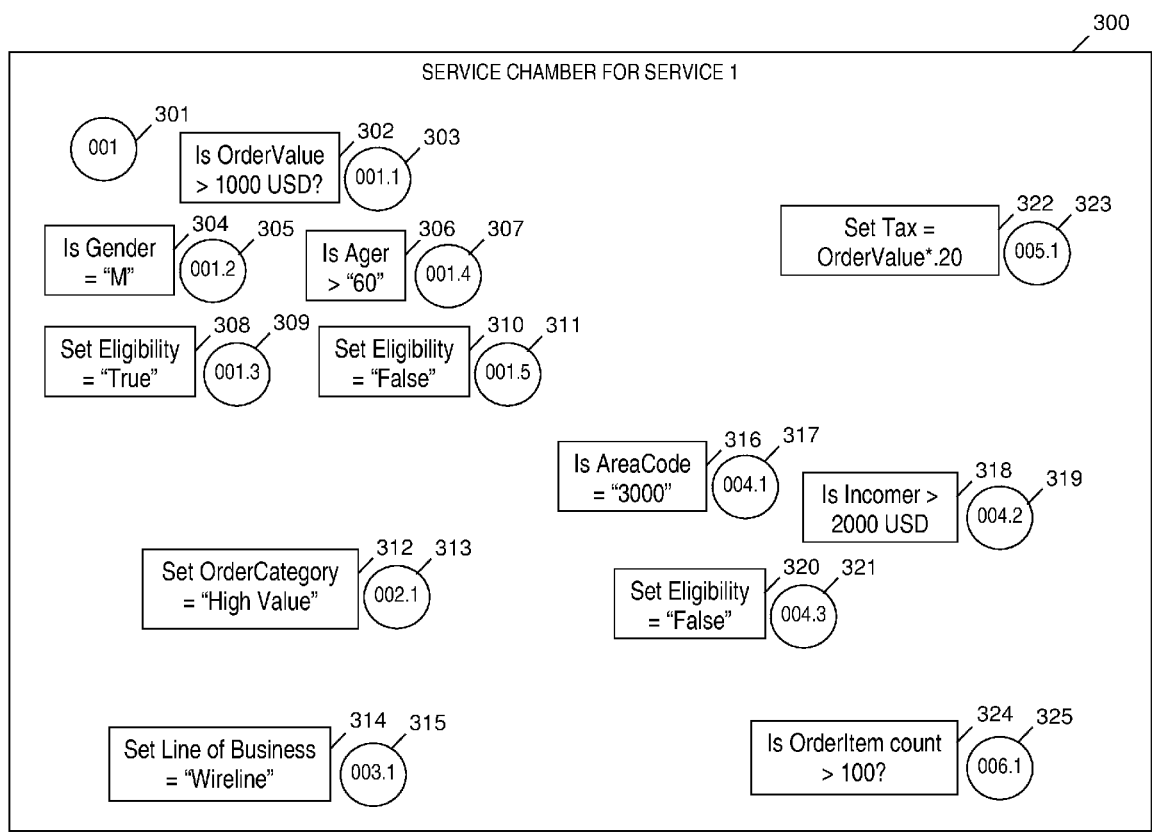
FIG. 3A depicts an example of a service container in which atomic tasks are created in the process of FIG. 2, in accordance with embodiments of the present invention.

FIG. 3A depicts an example of a service container in which atomic tasks are created in the process of FIG. 2, in accordance with embodiments of the present invention. A service chamber 300 for Service 1 is utilized by a user (e.g., designer) to create rule nodes and atomic tasks. After the rule nodes and atomic tasks are completed by the user, OFSA 116 (see FIG. 1) assigns a unique identifier for each rule and task. For example, identifier 301 (i.e., "001") is assigned to Service 1. Assignments of identifiers to rules or atomic tasks are shown in Table 1.

TABLE 1

| Rule/Atomic Task | Identifier |
|---|---|
| Rule 302 | Identifier 303 |
| Rule 304 | Identifier 305 |
| Rule 306 | Identifier 307 |
| Atomic task 308 | Identifier 309 |
| Atomic task 310 | Identifier 311 |
| Atomic task 312 | Identifier 313 |
| Atomic task 314 | Identifier 315 |
| Rule 316 | Identifier 317 |
| Rule 318 | Identifier 319 |
| Atomic task 320 | Identifier 321 |
| Atomic task 322 | Identifier 323 |
| Rule 324 | Identifier 325 |

The user may select to generate service interfaces (i.e., for request and response operations) and assign the sequence map filled in with the required sequence of identifiers. OFSA 116 (see FIG. 1) automatically generates the service interfaces as described above in the process of FIG. 2.

Figure 3B:
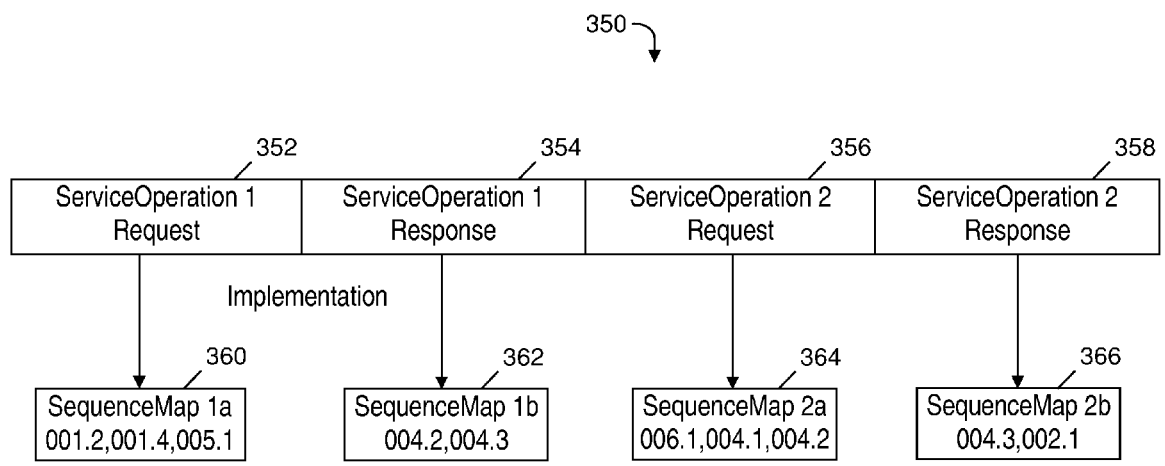
FIG. 3B depicts an example of an implementation of service operations based on sequence maps created in the process of FIG. 2, where the sequence maps include identifiers included in the service container in FIG. 3A, in accordance with embodiments of the present invention.

FIG. 3B depicts an example of an implementation of service operations based on sequence maps created in the process of FIG. 2, where the sequence maps include identifiers included in the service container in FIG. 3A, in accordance with embodiments of the present invention. Example 350 depicts how the implementation of service operations 352, 354, 356 and 358 is generated at runtime by sequence maps 360, 362, 364 and 366, respectively. For example, SequenceMap 1a 360 includes the following sequence of identifiers that are depicted in FIG. 3A: 001.2, 001.4, 005.1. Therefore, the sequence of identifiers 001.2, 001.4, 005.1 is the basis for generating ServiceOperation 1—Request 352. Similarly, SequenceMap 1b 362 is the basis for generating ServiceOperation 1—Response 354, SequenceMap 2a 364 is the basis for generating ServiceOperation 2—Request 356, and SequenceMap 2b 366 is the basis for generating ServiceOperation 2—Response 358.

Computer System

Figure 4:
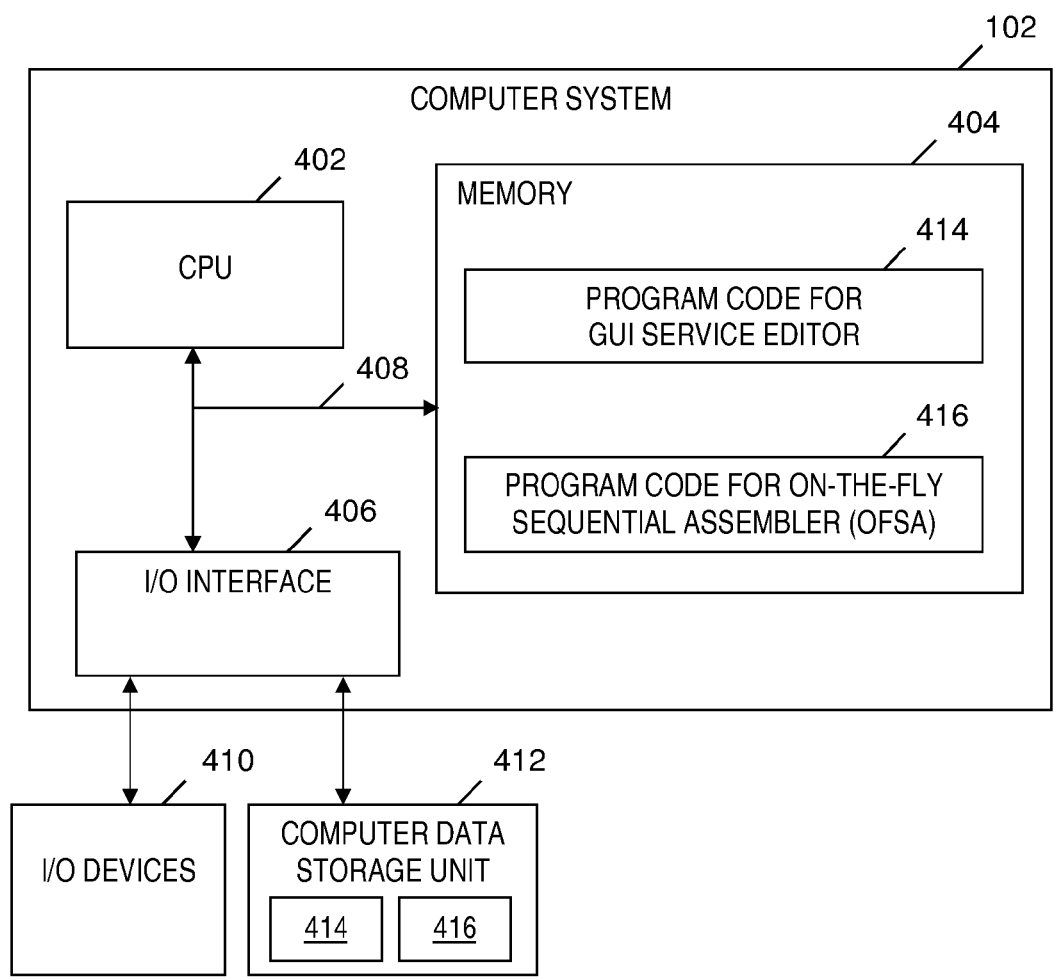
FIG. 4 is a block diagram of a computer system that is included in the system of FIG. 1 and that implements the process of FIG. 2, in accordance with embodiments of the present invention.

FIG. 4 is a block diagram of a computer system that is included in the system of FIG. 1 and that implements the process of FIG. 2, in accordance with embodiments of the present invention. Computer system 102 generally comprises a central processing unit (CPU) 402, a memory 404, an input/output (I/O) interface 406, and a bus 408. Further, computer system 102 is coupled to I/O devices 410 and a computer data storage unit 412. CPU 402 performs computation and control functions of computer system 102, including carrying out instructions included in program code 414 for the GUI service editor and program code 416 for the OFSA, where the program code 414 and 416 perform a method of defining an interface of a service in a service-oriented architecture environment, and where the instructions are carried out by CPU 402 via memory 404. CPU 402 may comprise a single processing unit, or be distributed across one or more processing units in one or more locations (e.g., on a client and server).

Memory 404 may comprise any known computer-readable storage medium, which is described below. In one embodiment, cache memory elements of memory 404 provide temporary storage of at least some program code (e.g., program code 414 and 416) in order to reduce the number of times code must be retrieved from bulk storage while instructions of the program code are carried out. Moreover, similar to CPU 402, memory 404 may reside at a single physical location, comprising one or more types of data storage, or be distributed across a plurality of physical systems in various forms. Further, memory 404 can include data distributed across, for example, a local area network (LAN) or a wide area network (WAN).

I/O interface 406 comprises any system for exchanging information to or from an external source. I/O devices 410 comprise any known type of external device, including a display device (e.g., monitor), keyboard, mouse, printer, speakers, handheld device, facsimile, etc. Bus 408 provides a communication link between each of the components in computer system 102, and may comprise any type of transmission link, including electrical, optical, wireless, etc.

I/O interface 406 also allows computer system 102 to store information (e.g., data or program instructions such as program code 414 and/or 416) on and retrieve the information from computer data storage unit 412 or another computer data storage unit (not shown). Computer data storage unit 412 may comprise any known computer-readable storage medium, which is described below. For example, computer data storage unit 412 may be a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 and 416 that includes instructions that are carried out by CPU 402 via memory 404 to define an interface of a service in a service-oriented architecture environment. Although FIG. 4 depicts memory 404 as including program code 414 and 416, the present invention contemplates embodiments in which memory 404 does not include all of code 414 and/or code 416 simultaneously, but instead at one time includes only a portion of code 414 and/or code 416.

Further, memory 404 may include other systems not shown in FIG. 4, such as an operating system (e.g., Linux) that runs on CPU 402 and provides control of various components within and/or connected to computer system 102.

Storage unit 412 and/or one or more other computer data storage units (not shown) that are coupled to computer system 102 may store service container 110 (see FIG. 1), atomic tasks 112 (see FIG. 1), sequence maps 118-1 and 118-2 (see FIG. 1) and/or service interface 120 (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 404 and/or computer data storage unit 412) having computer-readable program code (e.g., program code 414 and/or 416) embodied or stored thereon.

Any combination of one or more computer-readable mediums (e.g., memory 404 and computer data storage unit 412) may be utilized. The computer readable medium may be a computer-readable signal medium or a computer-readable storage medium. In one embodiment, the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 414 and 416) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 414 and 416) embodied on a computer-readable medium may be transmitted using any appropriate medium, including but not limited to wireless, wireline, optical fiber cable, RF, etc., or any suitable combination of the foregoing.

Computer program code (e.g., program code 414 and 416) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 4. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2) and/or block diagrams of methods, apparatus (systems) (e.g., FIG. 1 and FIG. 4), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 414 and 416). These computer program instructions may be provided to one or more hardware processors (e.g., CPU 402) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 404 or computer data storage unit 412) that can direct a computer (e.g., computer system 102), other programmable data processing apparatus, or other devices to function in a particular manner, such that the instructions (e.g., program 414 and 416) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 414 and 416) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to defining an interface of a service in a service-oriented architecture environment. Thus, an embodiment of the present invention discloses a process for supporting computer infrastructure, wherein the process comprises providing at least one support service for at least one of integrating, hosting, maintaining and deploying computer-readable code (e.g., program code 414 and 416) in a computer system (e.g., computer system 102) comprising one or more processors (e.g., CPU 402), wherein the processor(s) carry out instructions contained in the code causing the computer system to define an interface of a service in a service-oriented architecture environment.

In another embodiment, the invention provides a method that performs the process steps of the invention on a subscription, advertising and/or fee basis. That is, a service provider, such as a Solution Integrator, can offer to create, maintain, support, etc. a process of defining an interface of a service in a service-oriented architecture environment. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIG. 2 and the block diagrams in FIG. 1 and FIG. 4 illustrate the architecture, functionality, and operation of possible implementations of systems, methods, and computer program products according to various embodiments of the present invention. In this regard, each block in the flowchart or block diagrams may represent a module, segment, or portion of code (e.g., program code 414 and 416), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of defining an interface of a service in a service-oriented architecture environment, said method comprising:

a computer receiving definitions of atomic tasks of a first operation included in a first service, said first operation being a request or a response;

said computer assigning unique identifiers corresponding to said atomic tasks;

said computer receiving a sequence map required to implement said first service, wherein said received sequence map includes a sequence of said unique identifiers corresponding to a sequence of said atomic tasks of said first operation;

said computer receiving, via a palette, a specification of said sequence map using said unique identifiers and an association of said sequence map with said first operation;

said computer at a runtime invoking said first operation included in said first service;

responsive to said invoking said first operation and prior to reading said sequence of said unique identifiers, said computer selecting said sequence map based on said association of said sequence map with said first operation;

said computer at said runtime dynamically and automatically generating a first interface of said first service to define said first service by said reading said sequence of said unique identifiers in said received sequence map and assembling said sequence of said atomic tasks based on said read sequence of said unique identifiers;

said computer receiving second definitions of second atomic tasks of a second operation included in a second service;

said computer assigning second unique identifiers corresponding to said second atomic tasks;

said computer receiving a second sequence map required to implement said second service, wherein said received second sequence map includes a second sequence of said second unique identifiers corresponding to a second sequence of said second atomic tasks of said second operation; and said computer at said runtime dynamically and automatically generating a second interface of said second service to define said second service by reading said second sequence of said second unique identifiers in said received second sequence map and assembling said second sequence of said second atomic tasks based on said read second sequence of said second unique identifiers, wherein said reading said second sequence of said second unique identifiers and said assembling said second sequence of said second atomic tasks includes re-using at least one unique identifier of said unique identifiers corresponding to said atomic tasks of said first operation, and wherein said dynamically and automatically generating said first interface of said first service and said second interface of said second service does not require static models of said first and second operations, and further does not require creating first metadata for said first service and second metadata for said second service.

2. The method of claim 1, further comprising:
said computer creating a service container by receiving said atomic tasks via a graphical user interface; and
said computer storing said atomic tasks and said unique identifiers corresponding to said atomic tasks in said service container,
wherein said assembling said sequence of said atomic tasks includes retrieving said atomic tasks from said service container based on said read sequence of said unique identifiers.

3. The method of claim 1, further comprising responsive to said assembling said sequence of said atomic tasks based on said read sequence of said unique identifiers, said computer creating an instance of said atomic tasks in said sequence of said atomic tasks required to be performed as a result of said invoking said first operation.

4. A computer system comprising:
a central processing unit (CPU);
a memory coupled to said CPU;
a computer-readable, tangible storage device coupled to said CPU, said storage device containing instructions that are carried out by said CPU via said memory to implement a method of defining an interface of a service in a service-oriented architecture environment, said method comprising:
receiving definitions of atomic tasks of a first operation included in a first service, said first operation being a request or a response;
assigning unique identifiers corresponding to said atomic tasks;
receiving a sequence map required to implement said first service, wherein said received sequence map includes a sequence of said unique identifiers corresponding to a sequence of said atomic tasks of said first operation;
receiving, via a palette, a specification of said sequence map using said unique identifiers and an association of said sequence map with said first operation;
at a runtime of said computer system, invoking said first operation included in said first service;
responsive to said invoking said first operation and prior to reading said sequence of said unique identifiers, selecting said sequence map based on said association of said sequence map with said first operation;
at said runtime of said computer system, dynamically and automatically generating a first interface of said first service to define said first service by said reading said sequence of said unique identifiers in said received sequence map and assembling said sequence of said atomic tasks based on said read sequence of said unique identifiers;
receiving second definitions of second atomic tasks of a second operation included in a second service;
assigning second unique identifiers corresponding to said second atomic tasks;
receiving a second sequence map required to implement said second service, wherein said received second sequence map includes a second sequence of said second unique identifiers corresponding to a second sequence of said second atomic tasks of said second operation; and
at said runtime, dynamically and automatically generating a second interface of said second service to define said second service by reading said second sequence of said second unique identifiers in said received second sequence map and assembling said second sequence of said second atomic tasks based on said read second sequence of said second unique identifiers,
wherein said reading said second sequence of said second unique identifiers and said assembling said second sequence of said second atomic tasks includes re-using at least one unique identifier of said unique identifiers corresponding to said atomic tasks of said first operation, and
wherein said dynamically and automatically generating said first interface of said first service and said second interface of said second service does not require static models of said first and second operations, and further does not require creating first metadata for said first service and second metadata for said second service.

5. The computer system of claim 4, wherein said method further comprises:
creating a service container by receiving said atomic tasks via a graphical user interface; and
storing said atomic tasks and said unique identifiers corresponding to said atomic tasks in said service container,
wherein said assembling said sequence of said atomic tasks includes retrieving said atomic tasks from said service container based on said read sequence of said unique identifiers.

6. The computer system of claim 4, wherein said method further comprises responsive to said assembling said sequence of said atomic tasks based on said read sequence of said unique identifiers, creating an instance of said atomic tasks in said sequence of said atomic tasks required to be performed as a result of said invoking said first operation.

7. A computer program product, comprising:
a computer-readable, tangible storage device that is not a transitory signal medium, said storage device having a computer-readable program code stored therein, said computer-readable program code containing instructions that are carried out by a processor of a computer system to implement a method of defining an interface of a service in a service-oriented architecture environment, said method comprising:
receiving definitions of atomic tasks of a first operation included in a first service, said first operation being a request or a response;
assigning unique identifiers corresponding to said atomic tasks;
receiving a sequence map required to implement said first service, wherein said received sequence map includes
a sequence of said unique identifiers corresponding to a sequence of said atomic tasks of said first operation;
receiving, via a palette, a specification of said sequence map using said unique identifiers and an association of said sequence map with said first operation;
at a runtime of said computer system, invoking said first operation included in said first service;
responsive to said invoking said first operation and prior to reading said sequence of said unique identifiers, selecting said sequence map based on said association of said sequence map with said first operation;
at said a runtime of said computer system, dynamically and automatically generating a first interface of said first service to define said first service by said reading said sequence of said unique identifiers in said received sequence map and said assembling said sequence of said atomic tasks based on said read sequence of said unique identifiers;

receiving second definitions of second atomic tasks of a second operation included in a second service;

assigning second unique identifiers corresponding to said second atomic tasks;

receiving a second sequence map required to implement said second service, wherein said received second sequence map includes a second sequence of said second unique identifiers corresponding to a second sequence of said second atomic tasks of said second operation; and at said runtime dynamically and automatically generating a second interface of said second service to define said second service by reading said second sequence of said second unique identifiers in said received second sequence map and assembling said second sequence of said second atomic tasks based on said read second sequence of said second unique identifiers, wherein said reading said second sequence of said second unique identifiers and said assembling said second sequence of said second atomic tasks includes re-using at least one unique identifier of said unique identifiers corresponding to said atomic tasks of said first operation, and wherein said dynamically and automatically generating said first interface of said first service and said second interface of said second service does not require static models of said first and second operations, and further does not require creating first metadata for said first service and second metadata for said second service.

8. The program product of claim 7, wherein said method further comprises:

creating a service container by receiving said atomic tasks via a graphical user interface; and storing said atomic tasks and said unique identifiers corresponding to said atomic tasks in said service container, wherein said assembling said sequence of said atomic tasks includes retrieving said atomic tasks from said service container based on said read sequence of said unique identifiers.

9. The program product of claim 7, wherein said method further comprises responsive to said assembling said sequence of said atomic tasks based on said read sequence of said unique identifiers, creating an instance of said atomic tasks in said sequence of said atomic tasks required to be performed as a result of said invoking said first operation.

10. A process for supporting computing infrastructure, said process comprising providing at least one support service for at least one of creating, integrating, hosting, maintaining, and deploying computer-readable code in a computer comprising a processor, wherein said processor carries out instructions contained in said code causing said computer to perform a method of defining an interface of a service in a service-oriented architecture environment, wherein said method comprises:

said computer receiving definitions of atomic tasks of a first operation included in a first service, said first operation being a request or a response;

said computer assigning unique identifiers corresponding to said atomic tasks;

said computer receiving a sequence map required to implement said first service, wherein said received sequence map includes a sequence of said unique identifiers corresponding to a sequence of said atomic tasks of said first operation;

said computer receiving, via a palette, a specification of said sequence map using said unique identifiers and an association of said sequence map with said first operation;

said computer at a runtime invoking said first operation included in said first service;

responsive to said invoking said first operation and prior to reading said sequence of said unique identifiers, said computer selecting said sequence map based on said association of said sequence map with said first operation;

said computer at said runtime dynamically and automatically generating a first interface of said first service to define said first service by said reading said sequence of said unique identifiers in said received sequence map and assembling said sequence of said atomic tasks based on said read sequence of said unique identifiers;

said computer receiving second definitions of second atomic tasks of a second operation included in a second service;

said computer assigning second unique identifiers corresponding to said second atomic tasks;

said computer receiving a second sequence map required to implement said second service, wherein said received second sequence map includes a second sequence of said second unique identifiers corresponding to a second sequence of said second atomic tasks of said second operation; and said computer at said runtime dynamically and automatically generating a second interface of said second service to define said second service by reading said second sequence of said second unique identifiers in said received second sequence map and assembling said second sequence of said second atomic tasks based on said read second sequence of said second unique identifiers, wherein said reading said second sequence of said second unique identifiers and said assembling said second sequence of said second atomic tasks includes re-using at least one unique identifier of said unique identifiers corresponding to said atomic tasks of said first operation, and wherein said dynamically and automatically generating said first interface of said first service and said second interface of said second service does not require static models of said first and second operations, and further does not require creating first metadata for said first service and second metadata for said second service.

11. The process of claim 10, wherein said method further comprises:

said computer creating a service container by receiving said atomic tasks via a graphical user interface; and said computer storing said atomic tasks and said unique identifiers corresponding to said atomic tasks in said service container, wherein said assembling said sequence of said atomic tasks includes retrieving said atomic tasks from said service container based on said read sequence of said unique identifiers.

12. The process of claim 10, wherein said method further comprises responsive to said assembling said sequence of said atomic tasks based on said read sequence of said unique identifiers, said computer creating an instance of said atomic tasks in said sequence of said atomic tasks required to be performed as a result of said invoking said first operation.

* * * * *